April 19, 1960
W. C. RIESTER
2,932,842
WINDSHIELD CLEANER ARRANGEMENT
Filed June 28, 1956
4 Sheets-Sheet 1
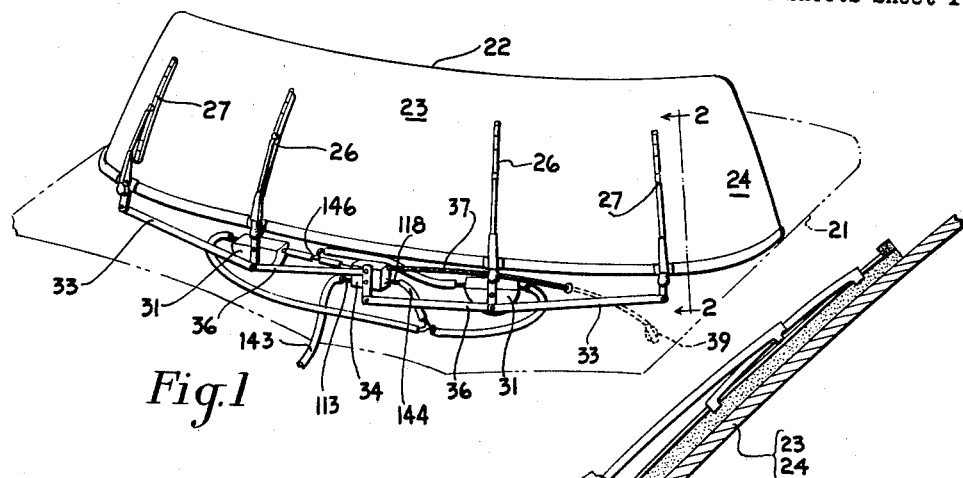
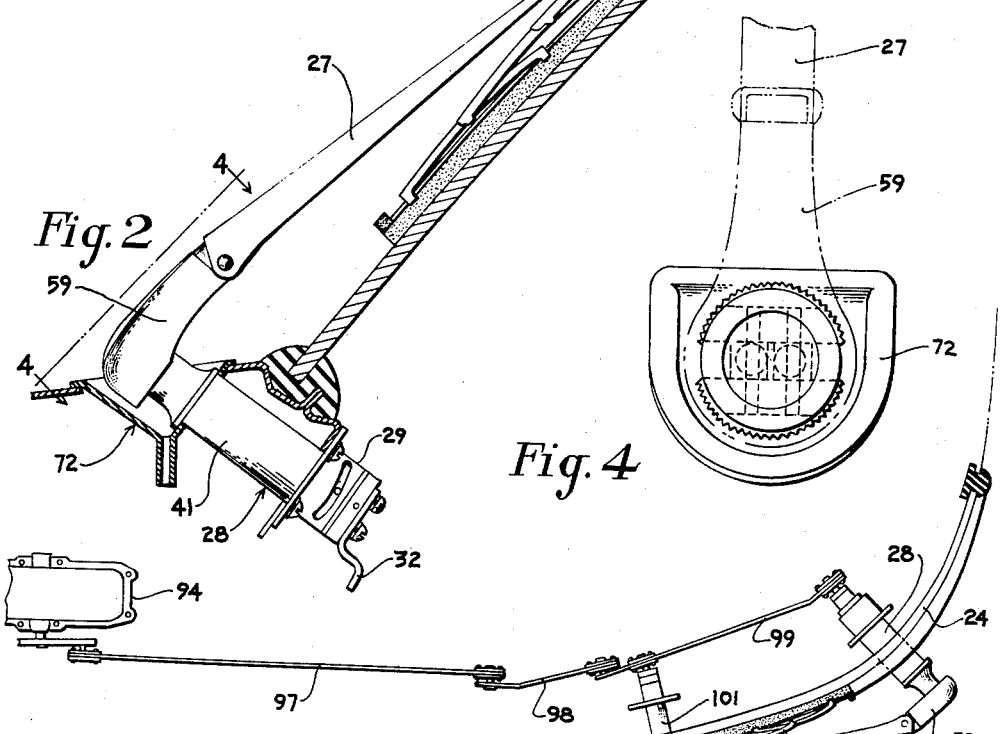
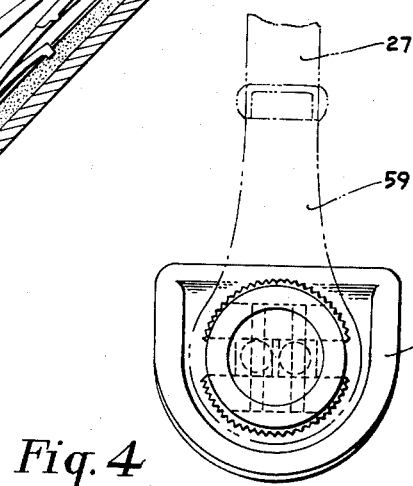
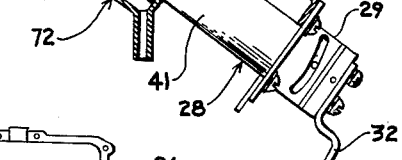
INVENTOR.
William C. Riester
BY
Bean Brooks Buckley & Bean
ATTORNEYS April 19, 1960 W. C. RIESTER 2,932,842
WINDSHIELD CLEANER ARRANGEMENT
Filed June 28, 1956 4 Sheets-Sheet 2
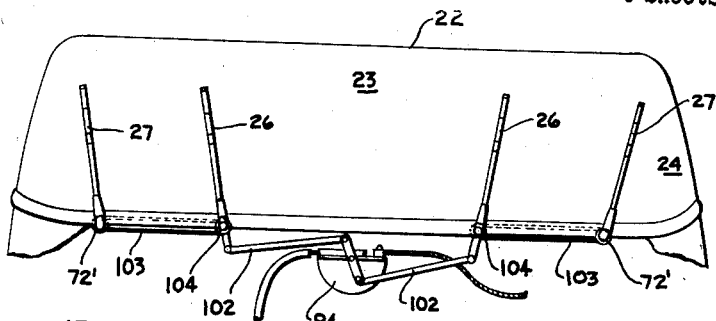
Fig. 5
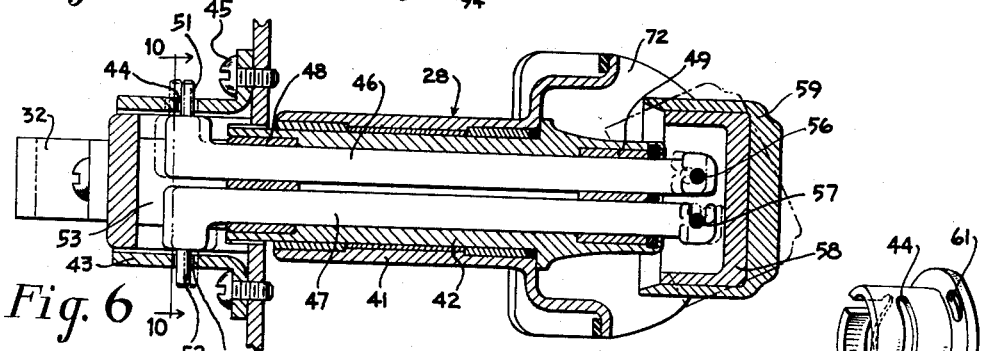
Fig. 6
Fig. 7
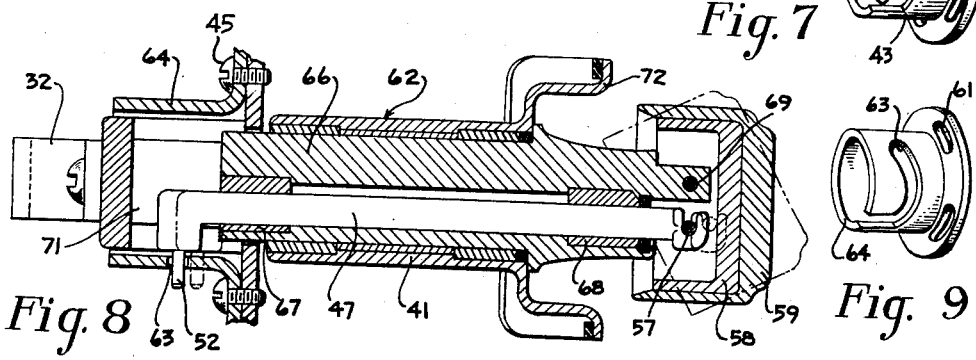
Fig. 8
Fig. 9
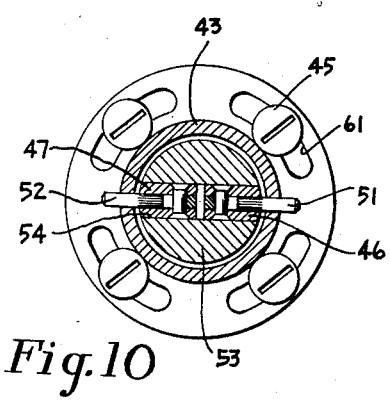
Fig. 10
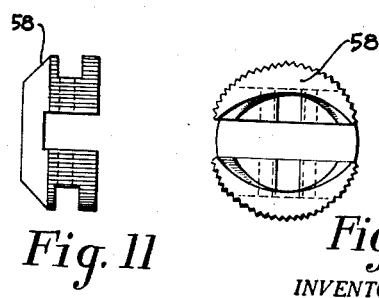
Fig. 11
Fig. 12
INVENTOR.
William C. Riester
BY
Bean Brooks Buckley + Bean.
ATTORNEYS April 19, 1960 W. C. RIESTER 2,932,842
WINDSHIELD CLEANER ARRANGEMENT
Filed June 28, 1956 4 Sheets-Sheet 3

INVENTOR.
William C. Riester
BY
Bean Brooks Buckley & Bean
ATTORNEYS

United States Patent Office 2,932,842
Patented Apr. 19, 1960

2,932,842

WINDSHIELD CLEANER ARRANGEMENT

William C. Riester, Buffalo, N.Y., assignor to Trico Products Corporation, Buffalo, N.Y.

Application June 28, 1956, Serial No. 594,602

9 Claims. (Cl. 15—250.21)

This invention relates to a vehicle windshield cleaning system, and more more particularly to a cleaning system for use on a windshield of the wraparound or panoramic type.

In the patent of J. R. Oishei et al., No. 2,691,186, issued October 12, 1954, a vehicle windshield cleaning system is disclosed which utilizes four wiper blades arranged to operate in synchronism for windshield wiping, and wherein exteriorly arranged cam means are provided on the outer two wipers to maintain them in contact with the windshield and normal thereto during wiping operation. The present invention has for its main object the provision of a different normalizing arrangement, including a rod supported in and movable lengthwise of the wiper drive shaft assembly, whereby the normalizing cam can be interiorly arranged as on an inner end of the wiper drive shaft assembly. The principle advantages of such a cam arrangement over that disclosed in the aforesaid patent, are that the cam is protected from the elements, and that the smooth line styling of the vehicle is not disturbed because the cam mechanism is out of sight under the vehicle cowling. Another feature of the present invention resides in the manner in which plural wiper motors are arranged and controlled for driving the wipers.

These and further objects and features of the invention will become more apparent from the following description and the accompanying drawings wherein:

Fig. 1 is a fragmentary perspective view of a motor vehicle having a windshield cleaning system embodying the principles of the invention in which a pair of wiper motors are used;

Fig. 2 is an enlarged sectional view as seen from line 2—2 in Fig. 1;

Fig. 3 is a section view illustrating a windshield cleaning system embodying the principles of the invention in which a single wiper motor is used;

Fig. 4 is a view as seen from line 4—4 in Fig. 2;

Fig. 5 is a fragmentary view of a motor vehicle having a windshield cleaning system embodying the principles of the invention in which a single wiper motor is used but having a somewhat different transmission arrangement as compared with that of the arrangement in Fig. 3;

Fig. 6 is a section view of a wiper drive shaft embodying the principles of the invention and illustrating a cam means arranged on the inner end of the drive shaft;

Fig. 7 is a perspective view of a cam sleeve used in the drive shaft of Fig. 6;

Fig. 8 is a sectional view of a modified form of a drive shaft embodying the principles of the invention;

Fig. 9 is a perspective view of a cam sleeve used in the drive shaft of Fig. 8;

Fig. 10 is a section view as seen from line 10—10 in Fig. 6;

Fig. 11 is a side view of a head used for the mounting of a wiper carrying arm to the drive shaft;

Fig. 12 is an end view of the head of Fig. 11;

Figure 13:
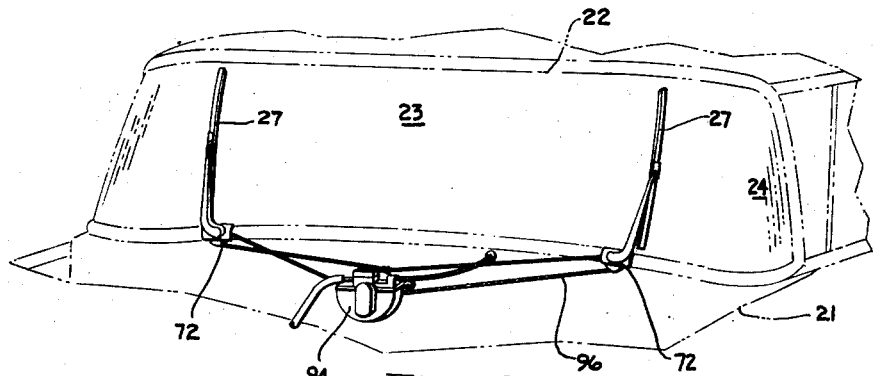
Fig. 13 is a fragmentary perspective view of a motor vehicle with a windshield cleaning system having a drive shaft assembly embodying the principles of the invention.

Referring now to the drawings and more particularly to Fig. 1, numeral 21 identifies a motor vehicle having a windshield 22 of the wraparound, or panoramic type, in which a frontal area 23 of relatively flat, or slightly curved design is joined on each end to lateral areas 24 which are arranged at a sharp angle to the frontal area. Two wiper blade assemblies 26 are arranged for wiping the frontal area, while two wiper blade assemblies 27 are arranged outwardly from the wiper blade assemblies 26, for wiping a portion of the frontal area and a portion of the side areas. The wiper blade assemblies 27 are each mounted upon a wiper drive shaft assembly 28 having a cam mechanism 29 on the inner end adapted for maintaining the wiper blade substantially normal to the windshield throughout its full range of arcuate travel. A pair of wiper motors 31 of the vacuum driven type are arranged for direct drive of each wiper blade assembly 26, and are connected to an arm 32 of the cam mechanism 29, by a link, or rod, 33 for operation of each wiper blade assembly 27. A control valve assembly 34, positioned mid-way between the wiper motors 31, is connected to each of the wiper motors by a link, or rod, 36. The control valve assembly 34 is adapted for pressure fluid control to provide operation of the wiper motors 31, as will be explained in greater detail hereinafter. A control cable 37, preferably in the form of a Bowden wire, is arranged for the operation of the control valve assembly 34, one end of the cable 37 being affixed to a sliding valve 38 (Fig. 19) of the control valve assembly, the other end being connected to a control knob 39 positioned in the vehicle within convenient reach of the vehicle operator.

The wiper drive shaft assembly 28 includes an outer casing 41 which is secured to the vehicle body, and an inner casing 42 rotatably supported within the outer casing, as best seen in Fig. 6. A cam sleeve 43, adjustably affixed to the vehicle body, by fastening means such as screws 45, is arranged to surround the inner end of the drive shaft assembly. The cam sleeve has a pair of cam grooves 44 diametrically arranged in the body of the sleeve, and being curved oppositely relative to the longitudinal axis of the shaft assembly, as best seen in Fig. 7.

A pair of rods 46 and 47 are mounted in bushings 48 and 49 supported at each end of the inner casing 42, said rods being arranged for longitudinal movement as provided by pin members 51, 52 respectively which extend through and slidingly engage the cam grooves 44. A hub member 53, arranged within the cam sleeve 43, and connected to the inner casing 42, has a slot 54 adapted to slidingly receive the end of the rods 46 and 47. The arm 32 is affixed to the outer surface of the hub member 53 whereby rotary motion of the arm member by virtue of connection to the link 33, will cause rotary motion of the hub member 53 as well as the inner casing 42. Such rotary motion will result in the reciprocal movement of the rods 46, 47, movement of rod 46 being opposite to that of rod 47 by reason of the engagement of pin members 51, 52, with the oppositely curved cam grooves 44. The outer end of each rod 46, 47 is connected to pin members 56 and 57 respectively which are supported in a head 58. It will be seen that the head 58 will be given a tilting motion as it is rotated by the rods 46, 47. Mounted upon the head 58 is an arm supporting member 59 to which is pivotally affixed the wiper blade assembly 27. The arrangement of the cam grooves 44 is such as to provide a rotary and tilting movement of the arm supporting member 59 whereby the wiper blade will be maintained normal to the surface of the windshield as it moves from the frontal area 23 to a lateral area 24. The cam sleeve 43 may be rotatably adjusted by reason of arcuate slots 61 formed therein so that the tilting action of the arm supporting member 59 may be more accurately adjusted to conform to the contour of the windshield.

The wiper drive shaft assembly 62 illustrated in Fig. 8 is similar to that above described the only difference being that one rod is eliminated. In the modified form of wiper drive shaft assembly the rod 47 has a pin member 52 which slidably engages a cam groove 63 formed in a cam sleeve 64 adjustably affixed to the vehicle body by screws 45. The outer casing 41 is arranged to rotatably support an inner casing 66 in which are mounted bushings 67 and 68 adapted to support the rod 47 for reciprocable movement. The outer end of the inner casing 66 has a pin member 69 for connection with the head 58, while the end of the rod 47 is connected to the head 58 by the pin member 57. A hub member 71 is connected to the inner casing 66 and has affixed to the outer surface the arm 32 whereby rotary motion may be transmitted to the inner casing 66. Such rotary motion results in the reciprocable movement of the rod 47 by virtue of the engagement of pin member 52 with the curved cam groove 63, in the manner of the wiper drive shaft assembly 28. Such reciprocating movement of the rod will cause a tilting movement of the head 58 as the latter is rotated, whereby the arm supporting member 59 will be operatively positioned to cause the wiper blade assembly 27 to be normal to the windshield throughout the range of its full arcuate travel.

It may be mentioned that in both wiper drive shaft assemblies 28 and 62, a pocket member 72 may be arranged at the outer end of the wiper shaft assembly to provide for pivotal mounting of the arm supporting member 59 slightly below the vehicle hood, as best illustrated in Fig. 2. In such manner, the end of the drive shaft assembly is maintained substantially out of line of sight of the vehicle operator.

Figure 14:
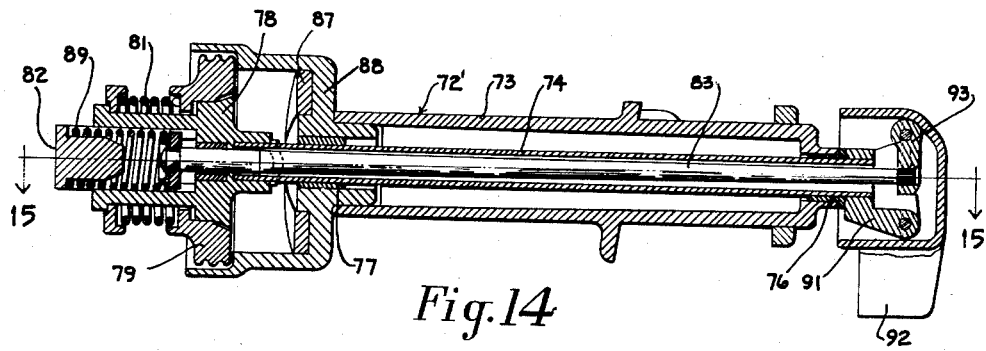
Fig. 14 is a section view of a modified form of drive shaft assembly embodying the principles of the invention.
Figure 15:
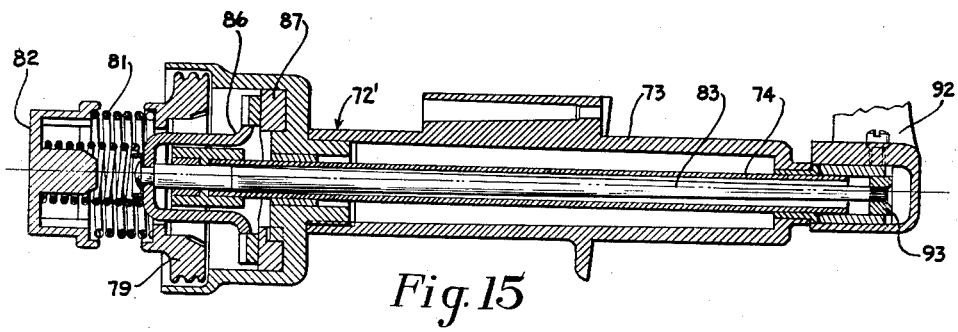
Fig. 15 is a section view as seen from line 15—15 in Fig. 14.

The wiper drive shaft assembly 72' illustrated in Figs. 14 and 15 represents a further modification. The drive shaft assembly 72' includes a pivot body, or outer casing 73, and a shaft 74 supported in bearings 76 and 77 for rotary movement within the outer casing. The shaft 74 is affixed at one end to a driven shaft hub 78, which is arranged for splined connection to a cable drum 79 the latter of which is rotatable by a cable attached to the wiper motor. A coil spring 81 is compressively arranged between a spring retainer 82 and the cable drum. Located within the shaft 74 is a push rod 83 to which is affixed a cam follower 84 having integral arms 86 the ends of which are adapted for sliding engagement with a cam 87 positioned in a pulley housing 88 which supports one end of the outer casing 73, the other end of which is supported by the vehicle cowling. A coil spring 89 is compressively arranged between the spring retainer 82 and the cam follower 84 to maintain the ends of the arms 86 in engagement with the cam 87. It will be seen that the arrangement is such as to cause reciprocating motion of the push rod 83 as the cam follower 84 is rotated with the shaft hub 78 and cable drum 79.

Affixed to the outer end of the shaft 74 is an end piece 91 to which is pivotally mounted a wiper arm head 92. The end of the push rod is connected with an arm member 93, the other end of the latter being pivotally connected to the wiper arm head 92. As the shaft 74 is caused to rotate, such rotary motion will be transmitted to the wiper arm head 92, and simultaneously, the wiper arm head will be given a tilting, or rocking motion by virtue of the connection with the push rod 83, the longitudinal movement of which is regulated by the shape of the cam 87. Such tilting motion of the wiper arm head 92 is arranged to cause the wiper blade assembly (not shown), which is pivotally connected to the wiper arm head 92, to be maintained substantially normal to the surface of the windshield throughout the full range of arcuate movement.

Figure 16:
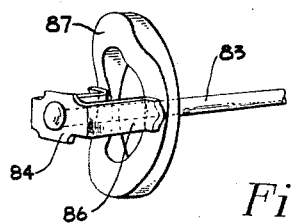
Fig. 16 is a perspective view of a cam means used in the drive shaft assembly of Fig. 14.

A typical arrangement utilizing the drive shaft assembly 72' is illustrated in Fig. 13, wherein a wiper motor 94 is connected by a cable means 96, to the cable drum 79 of the drive shaft assembly 72'. Other types of wiper motor transmission arrangements are illustrated in Figs. 3 and 5. In the arrangement shown in Fig. 3 a wiper motor 94 is arranged to drive all four wiper arm assemblies by means of links 97 and 98, the latter of which connects with a linkage arrangement 99 affixed to a wiper drive shaft assembly 101, and a wiper drive shaft assembly 28. The wiper drive shaft assembly 101 is of a conventional type in which only rotary motion is given to the associated wiper arm assembly, while the drive shaft assembly 28 includes a cam mechanism as illustrated in either Fig. 6 or Fig. 8. In Fig. 5, the wiper motor 94 is connected by linkage means 102 to the wiper drive shaft assembly 101, while a cable means 103 transmits rotary motion from a cable drum 104 of the drive shaft assembly 101, to the cable drum 79 of the wiper drive shaft assembly 72'. The wiper drive shaft assembly 72' has a cam means as discussed with respect to Figs. 14 to 16. It will be seen from the foregoing that the principles of the invention may be embodied in a variety of arrangements thus affording a selection which can be best accommodated to the vehicle body structure. It may be pointed out that in the description of the various arrangements, the same reference numerals have been applied to identical parts.

Figure 17:
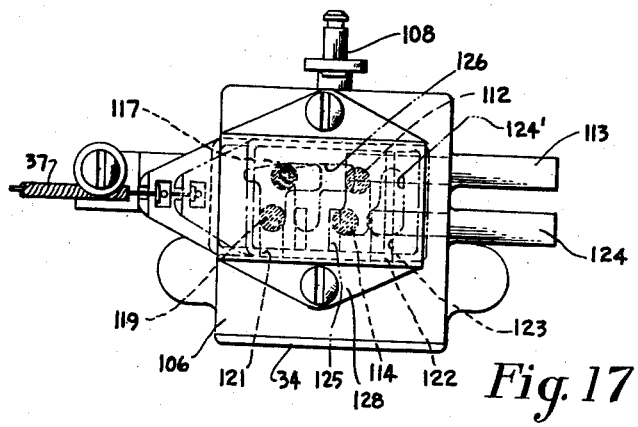
Fig. 17 is a plan view of a control valve assembly used in the wiper cleaning system shown in Fig. 1.
Figure 18:
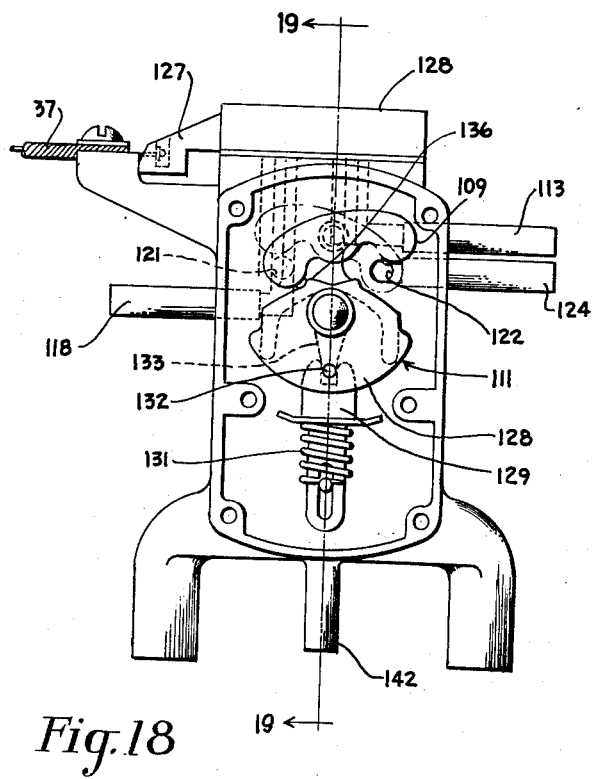
Fig. 18 is a side view of said control valve assembly.
Figure 19:
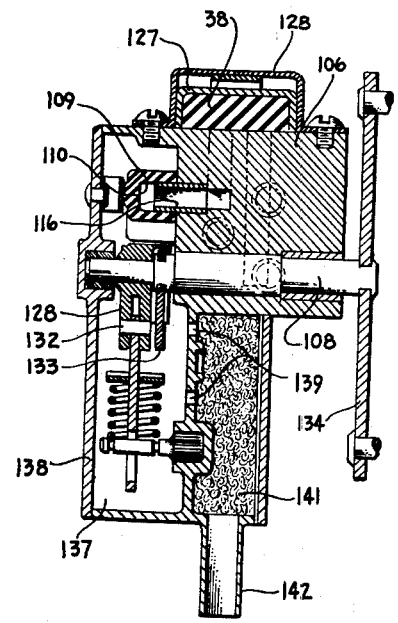
Fig. 19 is a section view as seen from line 19—19 in Fig. 18.

In the arrangement illustrated in Fig. 1, the wiper motors 31 differ from the conventional type of vacuum operated motors insofar as the valve operating structure of the motor is not arranged integral therewith, but rather a control valve assembly 34 is adapted for regulating air flow for motor operation. In other words, each of the wiper motors 31 is comprised of only a vane-like piston arranged for oscillatory movement in the motor housing, and a pair of hose connections arranged for pressure fluid flow to develop pressure differential on the piston whereby motor operating is effected. The control valve assembly 34, as best seen in Figs. 17 to 19, includes a valve body 106, a slide valve 38 arranged on the top of the valve body, a shaft 108 extending through the valve body and supported therein for rotary motion, a distributing valve 109 having a groove 110 on the inner side, and a kicker mechanism 111 adapted for the positional control of the distributing valve 109. A plurality of passageways are formed in the valve body 106, one passageway 112 which extends from a nipple 113 to the top surface of the valve body, a passageway 114 which extends from the top surface of the valve body to a nipple 116 adapted for the pivotal support of the distributing valve 109, a passageway 117 which leads from a nipple 118 to the top surface of the valve body, and a passageway 119 extending between the top surface of the valve body and a side face thereof where it terminates in an orifice 121 which is positioned within operative range of the distributing valve as it rocks upon the nipple 116. A second orifice 122, formed on the side face of the valve body opposite to the orifice 121, forms one end of a passageway 123 which connects with a nipple 124. The slide valve 38 has two grooves formed on its lower surface, a first groove 124' being adapted to bridge the ends of passageways 112 and 114 in one position of the slide valve for motor operation, and a second groove 126 which is adapted to bridge the ends of passageways 112 and 117 when the slide valve is positioned for wiper motor parking, and to bridge the ends of passageways 117 and 119 when the slide valve is positioned for motor operation. A slot 125 is arranged on the lower surface of the slide valve, which slot uncovers the passageway 114 to atmosphere when the slide valve is moved to motor parking position. The top and sides of the slide valve 38 are enclosed in a casing 127 to which is connected the cable of the Bowden wire 37, the casing being held for reciprocal motion by a cover 128 affixed to the top of the valve body.

The kicker mechanism 111 includes a kicker piece 128 which is rotatably supported upon the end of the shaft 108, and an arm member 129 which is urged by a compression spring 131 into engagement with a pin 132 supported in the arm member. Affixed to the shaft 108 is an arm piece 133 which is adapted to engage the kicker piece 128 at each end of arcuate movement of the arm piece.

The operation of the control valve 34 is as follows: Assume that the slide valve 38 has been shifted so that the groove 124' will bridge the ends of the passageways 112 and 114, and the groove 126 will bridge the ends of the passageways 117 and 119, it will be seen that in such position, vacuum connection will be made between the nipple 113 and the nipple 116 via passageway 112, groove 124', and passageway 114, thus producing vacuum condition in the distributing valve slot 110. The distributing valve slot 110, will connect the nipple 116 with an orifice, say 121, whereby vacuum condition will exist in passageway 119, groove 126, passageway 117, and nipple 118, to cause vacuum condition at one end of each of the wiper motors 31 via hose 144. At the same time, the orifice 122 will be exposed to atmospheric pressure existing in the chamber 137 thus allowing air flow in passageway 123, nipple 124, to each of the motors 31 via hose 146. The difference in pressure on each side of the wiper motor piston, or vane, will cause a pressure differential thereon resulting in the movement of the piston, which movement will be transmitted to the wiper arm assembly 26 and 27. As the wiper motor piston moves toward the end of its stroke, the crank member 134 will be rotated by virtue of connection to the links 36 resulting in the rotary motion of the kicker piece 128, which motion will result in the rotary shifting of the distributing valve 109 by reason of engagement with one of the cams 136. The new position of the distributing valve will result in the uncovering of orifice 121 to atmospheric pressure and the covering of the orifice 122, so that vacuum connection will exist between the nipple 116 and the orifice 122. In such position of the distributing valve it will be seen that vacuum conditions will be created in the wiper motors 31 via nipple 124 and hose 146, while at the same time the opposite side of each wiper piston will be exposed to atmospheric pressure from the chamber 137, orifice 121, and the circuit including the hose 144. Such difference in pressure will cause a pressure differential on the wiper motor piston resulting in the reverse movement of the piston and the wiper arms 26 and 27. The control valve 34 will continue to operate in such manner so as to provide reciprocating movement of the wiper arms upon the windshield until the slide valve is shifted to non-operative position. In such position of the slide valve, the groove 124' will be moved from abridgment with the ends of the passageways 112 and 114, while the groove 126 will be shifted for bridging the ends of the passageways 112 and 117. It will be seen that in such position of the slide valve, vacuum connection will be established between the nipple 113 and the nipple 118 to thus introduce vacuum on one side of the wiper motor pistons, while at the same time air under atmospheric pressure will flow onto the opposite side of the motor piston via nipple 124, passageway 123, orifice 122, valve groove 110, nipple 116, passageway 114, and the slot 125. In such manner the control valve 34 may be operated to cause parking of the wiper motors 31.

The foregoing description has been given in detail without thought of limitation since the inventive principles involved are capable of assuming other physical embodiments without departing from the spirit of the invention and the scope of the appended claims.

What is claimed is:

1. A windshield cleaner arrangement for use in a motor vehicle having a panoramic type windshield including a wiper drive shaft assembly, a wiper blade assembly, an elongated arm supporting member mounted upon the drive shaft assembly and pivotally supporting the wiper blade assembly, and a normalizing mechanism for maintaining the wiper blade assembly normal to the windshield during arcuate movement thereupon, said normalizing mechanism comprising a rod supported in the wiper drive shaft assembly for rotary motion therewith and for independent movement lengthwise thereof, said rod being connected to the arm supporting member, and cam means adapted to move the rod lengthwise during rotary movement of the wiper drive shaft assembly whereby the arm supporting member is rotated upon substantially its longitudinal axis.

2. A windshield cleaner arrangement for use in a motor vehicle having a panoramic type windshield including a wiper drive shaft assembly, a wiper blade assembly, an elongated arm supporting member rotatable about its longitudinal axis and pivotally supporting the wiper blade assembly, and a normalizing mechanism for maintaining the wiper blade assembly normal to the windshield during arcuate movement thereupon, said normalizing mechanism comprising a pair of rods supported in the wiper drive shaft assembly for rotary motion therewith and for relative independent movement lengthwise thereof, said rods being connected to the arm supporting member at laterally spaced points, and cam means adapted to move the rods lengthwise during rotary movement of the wiper drive shaft assembly whereby the arm supporting member is rotated upon substantially its longitudinal axis.

3. A windshield cleaner arrangement for use in a motor vehicle having a panoramic type windshield including a wiper drive shaft assembly having an outer casing and an inner casing supported for rotary motion in the outer casing, a wiper arm supporting member pivotally mounted upon one end of the inner casing, a rod supported in the inner casing and adapted for relative longitudinal motion therein, said rod being pivotally connected to the wiper arm supporting member whereby longitudinal movement of the rod will cause rocking movement of the wiper arm supporting member, a cam sleeve adapted to provide cam action whereby longitudinal movement of the rod is regulated, and an arm connected to the inner casing for transmission of rotary motion thereto.

4. A windshield cleaner arrangement for use in a motor vehicle having a panoramic type windshield including a wiper drive shaft assembly having an outer casing and an inner casing supported for rotary motion in the outer casing, a pair of rods supported in the inner casing and adapted for relative longitudinal motion therein, a wiper arm supporting member pivotally mounted upon one end of the rods whereby longitudinal movement of the rods will cause rocking movement of the wiper arm supporting member, a cam sleeve adapted to provide cam action whereby longitudinal movement of the rods is regulated, and an arm connected to the the inner casing for transmission of rotary motion thereto.

5. A windshield cleaner arrangement for use in a motor vehicle having a panoramic type windshield including a wiper drive shaft assembly having an outer casing and a shaft supported for rotary motion in the outer casing, a wiper arm head pivotally mounted upon one end of the shaft, a push rod supported in the shaft and arranged for relative longitudinal motion therein, said push rod being pivotally connected at one end to the wiper arm head whereby longitudinal motion of the push rod will cause rocking movement of the wiper arm head, a cam follower affixed to the other end of the push rod, a cam arranged for sliding engagement by the cam follower whereby longitudinal motion of the push rod is regulated, and means for transmission of rotary motion to the shaft said means including a driven shaft hub and a cable drum adjustably connected to the driven shaft hub.

6. A windshield cleaner arrangement for use in a motor vehicle having a panoramic type windshield including a wiper drive shaft assembly having an outer casing and a shaft supported for rotary motion in the outer casing, a wiper arm head pivotally mounted upon one end of the shaft, a push rod supported in the shaft and arranged for relative longitudinal motion therein, said push rod being pivotally connected at one end to the wiper arm head whereby longitudinal motion of the push rod will cause rocking movement of the wiper arm head, a cam follower affixed to the other end of the push rod, a cam arranged for sliding engagement by the cam follower whereby longitudinal motion of the push rod is regulated, and means for transmission of rotary motion to the shaft said means including a driven shaft hub, a cable drum adjustably connected to the driven shaft hub, and a resilient means adapted for maintaining the cam follower in sliding engagement with said cam.

7. In a windshield cleaner arrangement for use in a motor vehicle having a panoramic type windshield, a plurality of wiper blade assemblies, a plurality of wiper drive shaft assemblies for the operative support of each wiper blade assembly, a plurality of pressure fluid responsive motor means drivingly connected to the wiper drive shaft assemblies, and a control valve assembly arranged for the distribution of pressure fluid for the operation of the motor means, said control valve assembly including a reversible distributing valve responsive to operation of the motor means for the flow regulation of pressure fluid to the motor means.

8. In a windshield cleaner arrangement for use in a motor vehicle having a panoramic type windshield, a plurality of wiper blade assemblies arranged for reciprocating arcuate movement upon the windshield, a plurality of wiper drive shaft assemblies for the operative support of the wiper blade assemblies, a pair of pressure fluid responsive motor means drivingly connected to the wiper drive shaft assemblies, a control valve assembly arranged for the distribution of pressure fluid for the operation of the motor means, said control valve assembly including a reversible distributing valve responsive to the operation of the motor means for the flow regulation of pressure fluid thereto and a slide valve positionable for regulation of pressure fluid flow through the control valve assembly, and means arranged for the positional control of said slide valve.

9. In a vehicle windshield cleaner arrangement having a plurality of pressure fluid responsive wiper motors, a control valve assembly adapted for the distribution of pressure fluid for the operation of said motors, said control valve assembly including a distribution valve positionable for alternately connecting motor conduit means with a source of vacuum, a slide valve positionable for interrupting the fluid circuit between the distributing valve and the vacuum source, a shaft rotatably supported in the control valve assembly, one end of said shaft having a crank member adapted to receive motor connecting links for being rotated in response to operation of said motors, a kicker piece rotatably supported on the other end of said shaft, an arm piece affixed to said shaft and arranged for engaging the kicker piece at predetermined rotary positions of the shaft, said kicker piece being adapted for the positional control of the distributing valve, and a spring adapted for resisting movement of the kicker piece during part of the rotary movement thereof and for assisting movement of the kicker piece during the remainder of said kicker piece rotary movement.

References Cited in the file of this patent
UNITED STATES PATENTS

| | | |
|---|---|---|
| 1,719,660 | Horton | July 2, 1929 |
| 2,363,621 | Rappl | Nov. 28, 1944 |
| 2,691,186 | Oishei | Oct. 12, 1954 |
| 2,790,989 | Wallis | May 7, 1957 |
| 2,795,809 | Vischuhis | June 18, 1957 |
| 2,852,799 | Wallis | Sept. 23, 1958 |

FOREIGN PATENTS

| | | |
|---|---|---|
| 111,683 | Australia | Apr. 15, 1939 |